(12) United States Patent
High et al.

(10) Patent No.: US 10,115,139 B2
(45) Date of Patent: Oct. 30, 2018

(54) SYSTEMS AND METHODS FOR COLLABORATIVE SHOPPING

(71) Applicant: Walmart Apollo, LLC, Bentonville, AR (US)

(72) Inventors: Donald Ray High, Noel, MO (US); Eric Eugene Welch, Bentonville, AR (US); Michael Atchley, Springdale, AR (US)

(73) Assignee: Walmart Apollo, LLC, Bentonville, AR (US)

( * ) Notice: Subject to any disclaimer, the term of this patent is extended or adjusted under 35 U.S.C. 154(b) by 899 days.

(21) Appl. No.: 14/084,163

(22) Filed: Nov. 19, 2013

(65) Prior Publication Data

US 2015/0142591 A1 May 21, 2015

(51) Int. Cl.
*G06Q 30/06* (2012.01)
*G06Q 20/40* (2012.01)
*G06Q 20/20* (2012.01)

(52) U.S. Cl.
CPC ....... *G06Q 30/0613* (2013.01); *G06Q 20/202* (2013.01); *G06Q 20/401* (2013.01)

(58) Field of Classification Search
USPC .................................................. 705/26.8, 21
See application file for complete search history.

(56) References Cited

U.S. PATENT DOCUMENTS

| | | |
|---|---|---|
| 4,742,911 A | 5/1988 | Manuel |
| 5,646,389 A | 7/1997 | Bravman |
| 6,113,148 A | 9/2000 | Koranda |
| 6,204,763 B1 | 3/2001 | Sone |
| 6,249,773 B1 | 6/2001 | Allard |
| 6,249,774 B1 | 6/2001 | Roden |
| 6,327,576 B1 | 12/2001 | Ogasawara |
| 6,386,450 B1 | 5/2002 | Ogasawara |

(Continued)

FOREIGN PATENT DOCUMENTS

| | | |
|---|---|---|
| EP | 1176377 A1 | 1/2002 |
| WO | WO2000022560 A2 | 4/2000 |

OTHER PUBLICATIONS

Mexican Office Action, Application No. MX/a/2016/006505, dated Sep. 18, 2017, 2 pages.

(Continued)

*Primary Examiner* — Scott A Zare
*Assistant Examiner* — Reva R Danzig
(74) *Attorney, Agent, or Firm* — Patterson Thuente Pedersen, P.A.

(57) ABSTRACT

Systems and methods are disclosed herein for facilitating collaborative shopping. Notifications may be sent to remote devices in response to a shopper's device entering a store or within a given proximity to a store. Notifications may invoke or include an interface to add items to a shared shopping list. Notifications from the shopper's device may be sent in advance of a user entering a store to alert friends and family to add items to the shared shopping list. A remote device may be used to authorize and instruct the shopper's device to pick up items that have been previously purchased either automatically or in response to an input from a user of the remote device. Authorization to pick up the previously-purchased item may be transmitted to one or both of a merchant and the shopper's device.

20 Claims, 9 Drawing Sheets

(56) References Cited

U.S. PATENT DOCUMENTS

| | | |
|---|---|---|
| 6,513,017 B1 | 1/2003 | Howard |
| 6,601,759 B2 | 8/2003 | Fife et al. |
| 6,886,101 B2 | 4/2005 | Glazer et al. |
| 6,963,851 B1 | 11/2005 | Szabo |
| 7,130,814 B1 | 10/2006 | Szabo |
| 7,222,363 B2 | 5/2007 | Rice et al. |
| 7,431,208 B2 | 10/2008 | Feldman et al. |
| 7,587,756 B2 | 9/2009 | Peart et al. |
| 7,689,473 B2 | 3/2010 | Borom |
| 8,538,807 B2 | 9/2013 | Dishneau |
| 8,572,712 B2 | 10/2013 | Rice et al. |
| 8,583,512 B1 | 11/2013 | Gupta |
| 8,814,039 B2 | 8/2014 | Bishop et al. |
| 8,820,633 B2 | 9/2014 | Bishop et al. |
| 8,851,369 B2 | 10/2014 | Bishop et al. |
| 2004/0093274 A1 | 5/2004 | Vanska |
| 2007/0194113 A1 | 8/2007 | Esplin |
| 2009/0187489 A1* | 7/2009 | Mallick ............... G06Q 30/06 705/26.1 |
| 2010/0030624 A1 | 2/2010 | Vänskä |
| 2010/0070365 A1 | 3/2010 | Siotia |
| 2010/0262554 A1 | 10/2010 | Elliott |
| 2012/0185355 A1* | 7/2012 | Kilroy ............... G06Q 30/0633 705/26.8 |
| 2012/0197753 A1 | 8/2012 | Kalin |
| 2012/0277991 A1 | 11/2012 | Wagner |
| 2012/0296742 A1 | 11/2012 | Patwa |
| 2012/0303480 A1 | 11/2012 | Stone |
| 2013/0124362 A1 | 5/2013 | Katcher |
| 2013/0185150 A1 | 7/2013 | Crum |
| 2013/0211953 A1 | 8/2013 | Abraham |
| 2013/0275273 A1* | 10/2013 | Champlin ............ G06Q 10/02 705/26.81 |
| 2014/0066101 A1* | 3/2014 | Lyman ................ H04W 4/001 455/456.3 |
| 2014/0091001 A1 | 4/2014 | Chan |
| 2014/0214564 A1* | 7/2014 | Argue ............... G06Q 30/0633 705/16 |

OTHER PUBLICATIONS

Canadian Office Action, Application No. 2,930,601, dated Feb. 23, 2017, 5 pages.
Canadian Office Action, Application No. 2,930,601, dated Jan. 30, 2018, 7 pages.

* cited by examiner

SYSTEMS AND METHODS FOR COLLABORATIVE SHOPPING

FIELD OF THE INVENTION

This invention relates to systems and methods for generating shopping lists for a consumer.

BACKGROUND OF THE INVENTION

A busy shopper may have a large number of items to pick up. Upon arrival at a point of sale many customers have had the unpleasant experience of realizing that a needed item is not in the customer's cart or was not purchased during a weekly shopping trip. Remedying this situation is inconvenient for all. A cashier may simply wait while the customer goes to retrieve the item. This increases the time the customer requires to checkout. Other customers in line may become particularly frustrated if made to wait. The cashier might simply conclude the transaction for the retrieved items, requiring the customer to retrieve the item and then wait in line again to purchase the unretrieved item. This creates additional inconvenience inasmuch as the purchase of previously purchased items may need to be verified by the cashier when processing payment for the previously unretrieved item. Arriving home only to realize that a needed item was not purchased may further inconvenience a customer. Where a person is shopping for multiple people this problem is compounded inasmuch as any one of multiple people may realize that they need an item from the store after a shopping trip has taken place.

The systems and methods described herein provide an improved approach for enabling multiple people to collaborate during a shopping trip.

BRIEF DESCRIPTION OF THE DRAWINGS

In order that the advantages of the invention will be readily understood, a more particular description of the invention will be rendered by reference to specific embodiments illustrated in the appended drawings. Understanding that these drawings depict only typical embodiments of the invention and are not therefore to be considered limiting of its scope, the invention will be described and explained with additional specificity and detail through use of the accompanying drawings, in which.

DETAILED DESCRIPTION

It will be readily understood that the components of the invention, as generally described and illustrated in the Figures herein, could be arranged and designed in a wide variety of different configurations. Thus, the following more detailed description of the embodiments of the invention, as represented in the Figures, is not intended to limit the scope of the invention, as claimed, but is merely representative of certain examples of presently contemplated embodiments in accordance with the invention. The presently described embodiments will be best understood by reference to the drawings, wherein like parts are designated by like numerals throughout.

The invention has been developed in response to the present state of the art and, in particular, in response to the problems and needs in the art that have not yet been fully solved by currently available apparatus and methods.

Embodiments in accordance with the invention may be embodied as an apparatus, method, or computer program product. Accordingly, the invention may take the form of an entirely hardware embodiment, an entirely software embodiment (including firmware, resident software, micro-code, etc.), or an embodiment combining software and hardware aspects that may all generally be referred to herein as a "module" or "system." Furthermore, the invention may take the form of a computer program product embodied in any tangible medium of expression having computer-usable program code embodied in the medium.

Any combination of one or more computer-usable or computer-readable media may be utilized. For example, a computer-readable medium may include one or more of a portable computer diskette, a hard disk, a random access memory (RAM) device, a read-only memory (ROM) device, an erasable programmable read-only memory (EPROM or Flash memory) device, a portable compact disc read-only memory (CDROM), an optical storage device, and a magnetic storage device. In selected embodiments, a computer-readable medium may comprise any non-transitory medium that can contain, store, communicate, propagate, or transport the program for use by or in connection with the instruction execution system, apparatus, or device.

Computer program code for carrying out operations of the invention may be written in any combination of one or more programming languages, including an object-oriented programming language such as Java, Smalltalk, C++, or the like and conventional procedural programming languages, such as the "C" programming language or similar programming languages. The program code may execute entirely on a computer system as a stand-alone software package, on a stand-alone hardware unit, partly on a remote computer spaced some distance from the computer, or entirely on a remote computer or server. In the latter scenario, the remote computer may be connected to the computer through any type of network, including a local area network (LAN) or a wide area network (WAN), or the connection may be made to an external computer (for example, through the Internet using an Internet Service Provider).

The embodiments disclosed herein may advantageously be implemented using a Java language and runtime environment or a Node.js implementation. In particular, functionality implemented on a server may be implementing using one or both of these methods.

The invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions or code. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Embodiments can also be implemented in cloud computing environments. In this description and the following claims, "cloud computing" is defined as a model for enabling ubiquitous, convenient, on-demand network access to a shared pool of configurable computing resources (e.g., networks, servers, storage, applications, and services) that can be rapidly provisioned via virtualization and released with minimal management effort or service provider interaction, and then scaled accordingly. A cloud model can be composed of various characteristics (e.g., on-demand self-service, broad network access, resource pooling, rapid elasticity, measured service, etc.), service models (e.g., Software as a Service ("SaaS"), Platform as a Service ("PaaS"), Infrastructure as a Service ("IaaS"), and deployment models (e.g., private cloud, community cloud, public cloud, hybrid cloud, etc.).

Figure 1:
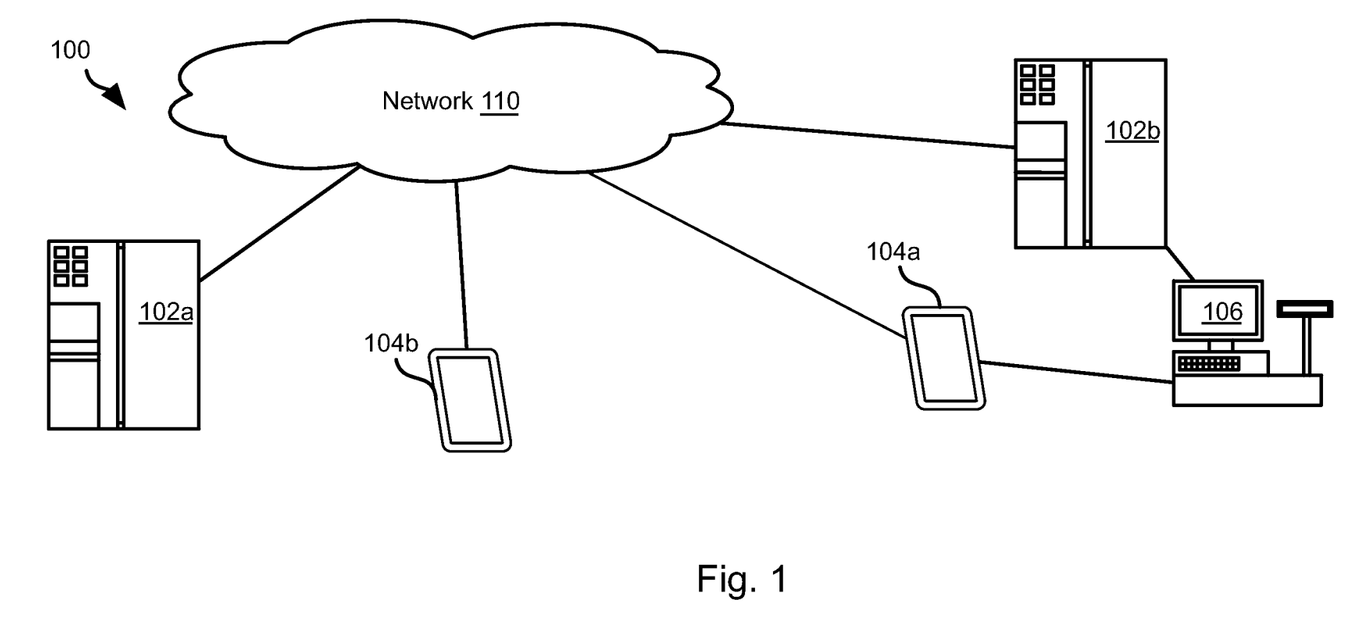
FIG. 1 is a schematic block diagram of a system suitable for performing methods in accordance with embodiments of the invention.

FIG. 1 illustrates a system 100 in which methods described hereinbelow may be implemented. The system 100 may include a server system 102a that may be embodied as one or more server computers each including one or more processors that are in data communication with one another. The server system 102a may be in data communication with one or more customer computers 104a, 104b and one or more point of sale (POS) devices 106. In the methods disclosed herein, a customer computer 104a, 104b is advantageously a mobile device such as a mobile phone or tablet computer. As known in the art, many mobile phones and tablet computers also include cameras that can be used to scan optical codes such as barcodes, two-dimensional bar codes (e.g. quick response (QR) codes), or textual information. In some embodiments, some or all of the methods disclosed herein may be performed using a desktop computer or any other computing device as the customer computer 104a, 104b. For purposes of this disclosure, discussion of communication with a user or entity or activity performed by the user or entity may be interpreted as communication with a computer 104a, 104b associated with the user or entity or activity taking place on a computer associated with the user or entity. A POS 106 may be located within a store and may be part of a POS network. In some embodiments, a POS 106 may be operable to process online transactions. In some embodiments, separate computers of the server system 102a may handle communication with the customer computers 104a, 104b and POS 106.

In some embodiments, a server system 102a is a global server system 102a owned or controlled by a merchant operating multiple stores, such as over a large geographic area. Individual stores or groups of stores may have their own local server systems 102b that store or access data that is unique to a particular store or to stores in a particular region. In such embodiments, the local server system 102b may likewise be in data communication with the POS 106 associated with the server system 102b, such as the POS 106 of a store or stores in a region. In some embodiments, the server system 102b may be in data communication with representative computing device 108 that is carried or otherwise accessible by a store representative.

The server system 102b may communicate with the POS 106. The server system 102a may likewise communicate with the server 102b such as by means of a network 110. The network 110 may be embodied as a peer-to-peer wireless connection between devices, a connection through a local area network (LAN), WiFi network, the Internet, or any other communication medium or system. The user computing devices 104a, 104b may likewise communicate with the server system 102a or 102b by means of the network 110. In some embodiments, the user computing devices 104a, 104b communicate with one or both of the POS 106 and server 102b by way of the server system 102a in order to implement the methods disclosed herein. In other embodiments, a user computing device 104a, 104b communicates directly with these devices by means of a network such as a network local to a store or the network 110.

Figure 2:
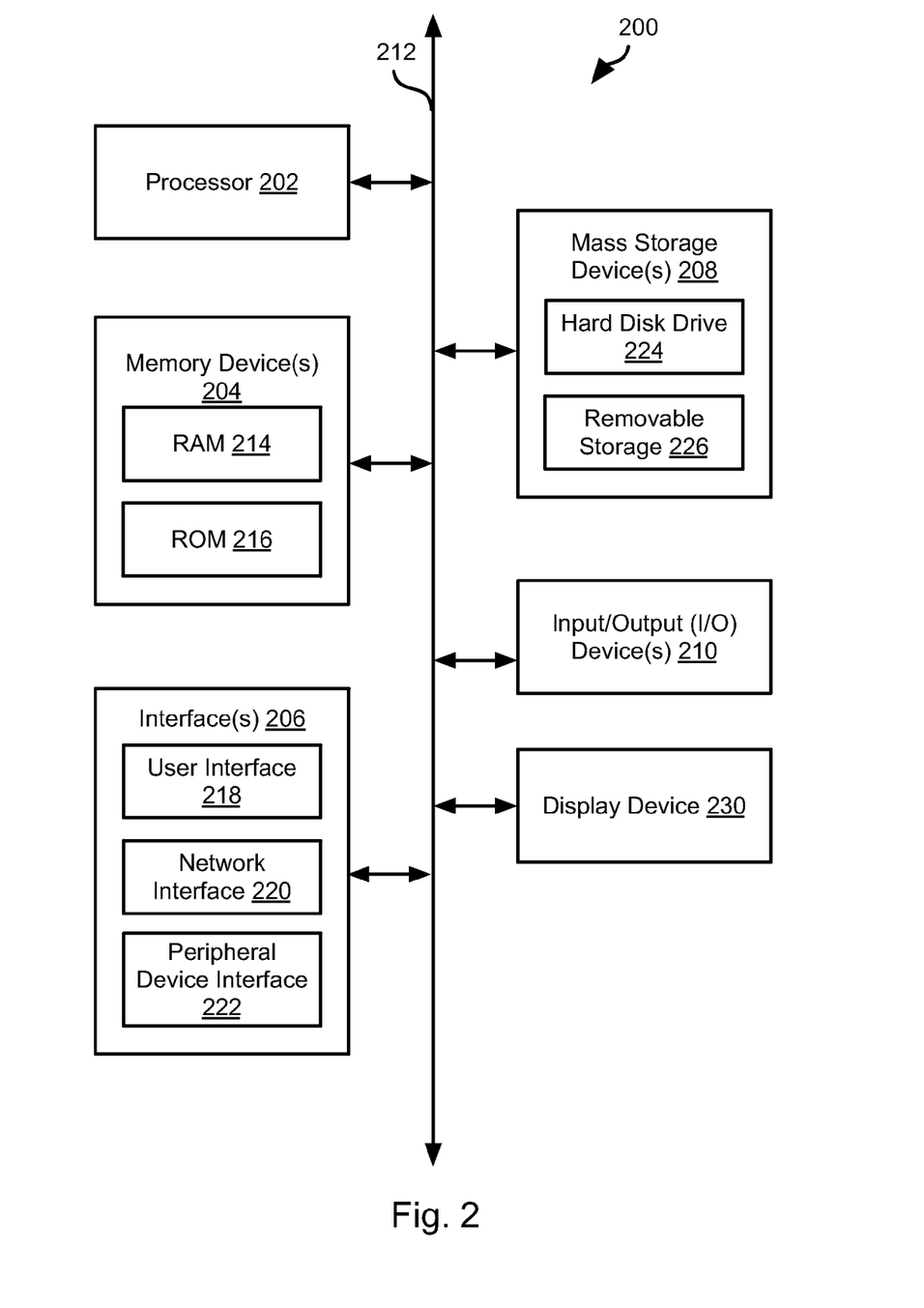
FIG. 2 is a block diagram of a computing device suitable for implementing embodiments of the invention.

FIG. 2 is a block diagram illustrating an example computing device 200. Computing device 200 may be used to perform various procedures, such as those discussed herein. A server system 102a, 102b, customer device 104, POS 106, and representative computing device 108 may include some or all of the attributes of the computing device 200. Computing device 200 can function as a server, a client, or any other computing entity. Computing device can perform various monitoring functions as discussed herein, and can execute one or more application programs, such as the application programs described herein. Computing device 200 can be any of a wide variety of computing devices, such as a desktop computer, a notebook computer, a server computer, a handheld computer, tablet computer and the like.

Computing device 200 includes one or more processor(s) 202, one or more memory device(s) 204, one or more interface(s) 206, one or more mass storage device(s) 208, one or more Input/Output (I/O) device(s) 210, and a display device 230 all of which are coupled to a bus 212. Processor(s) 202 include one or more processors or controllers that execute instructions stored in memory device(s) 204 and/or mass storage device(s) 208. Processor(s) 202 may also include various types of computer-readable media, such as cache memory.

Memory device(s) 204 include various computer-readable media, such as volatile memory (e.g., random access memory (RAM) 214) and/or nonvolatile memory (e.g., read-only memory (ROM) 216). Memory device(s) 204 may also include rewritable ROM, such as Flash memory.

Mass storage device(s) 208 include various computer readable media, such as magnetic tapes, magnetic disks, optical disks, solid-state memory (e.g., Flash memory), and so forth. As shown in FIG. 2, a particular mass storage device is a hard disk drive 224. Various drives may also be included in mass storage device(s) 208 to enable reading from and/or writing to the various computer readable media. Mass storage device(s) 208 include removable media 226 and/or non-removable media.

I/O device(s) 210 include various devices that allow data and/or other information to be input to or retrieved from computing device 200. Example I/O device(s) 210 include cursor control devices, keyboards, keypads, microphones, monitors or other display devices, speakers, printers, network interface cards, modems, lenses, CCDs or other image capture devices, and the like.

Display device 230 includes any type of device capable of displaying information to one or more users of computing device 200. Examples of display device 230 include a monitor, display terminal, video projection device, and the like.

Interface(s) 206 include various interfaces that allow computing device 200 to interact with other systems, devices, or computing environments. Example interface(s) 206 include any number of different network interfaces 220, such as interfaces to local area networks (LANs), wide area networks (WANs), wireless networks, and the Internet. Other interface(s) include user interface 218 and peripheral device interface 222. The interface(s) 206 may also include one or more user interface elements 218. The interface(s) 206 may also include one or more peripheral interfaces such as interfaces for printers, pointing devices (mice, track pad, etc.), keyboards, and the like.

Bus 212 allows processor(s) 202, memory device(s) 204, interface(s) 206, mass storage device(s) 208, and I/O device(s) 210 to communicate with one another, as well as other devices or components coupled to bus 212. Bus 212 represents one or more of several types of bus structures, such as a system bus, PCI bus, IEEE 1394 bus, USB bus, and so forth.

For purposes of illustration, programs and other executable program components are shown herein as discrete blocks, although it is understood that such programs and components may reside at various times in different storage components of computing device 200, and are executed by processor(s) 202. Alternatively, the systems and procedures described herein can be implemented in hardware, or a combination of hardware, software, and/or firmware. For example, one or more application specific integrated circuits (ASICs) can be programmed to carry out one or more of the systems and procedures described herein.

Figure 3:
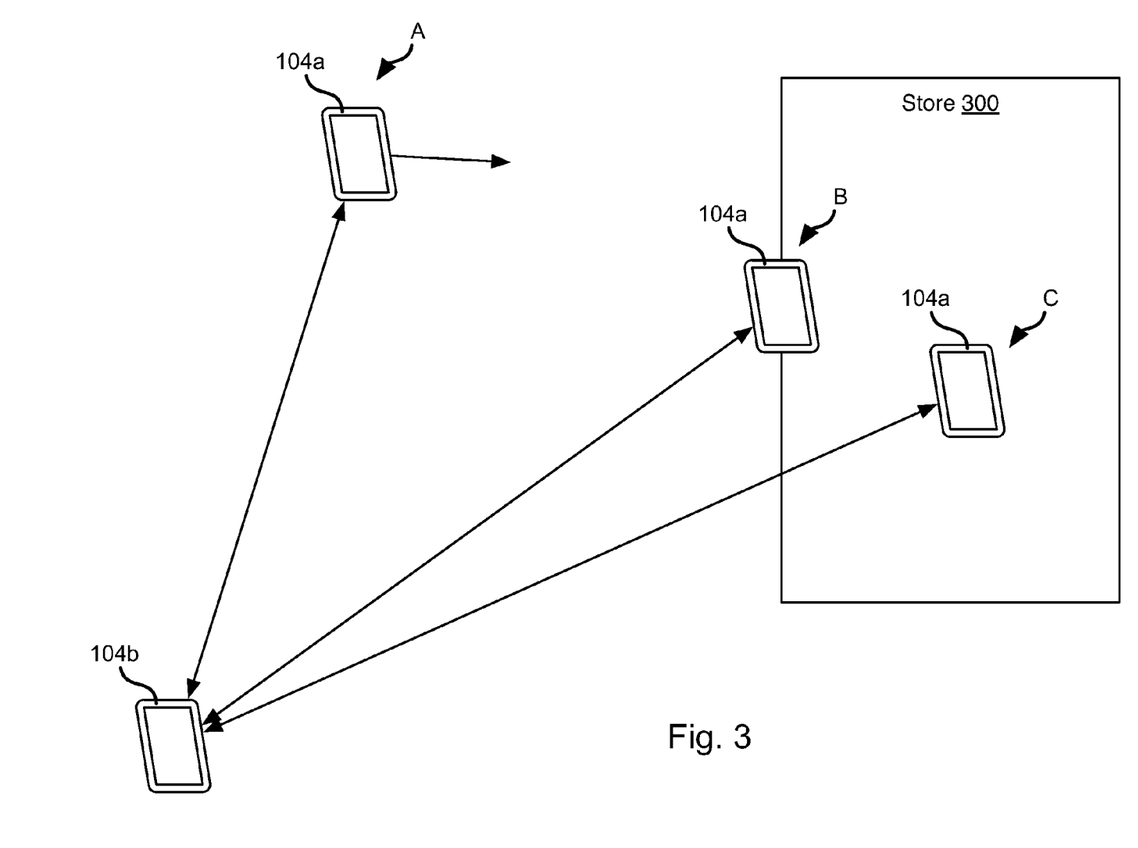
FIG. 3 is schematic block diagram of interaction between user computing devices during performance of methods in accordance with an embodiment of the present invention.

Referring to FIG. 3, methods disclosed herein may facilitate collaboration among multiple users each having a corresponding user device 104a, 104b associated therewith. For example, a shopper device 104a for a person performing a shopping trip may communicate with a remote device 104b for a friend or family member that is not present during the shopping trip.

For example, moving from left to right in FIG. 3, the shopper device 104a may transmit a message to the remote device 104b at a position A that is remote from a store 300 when the shopper is heading or about to head to a store 300. Such a notification may be transmitted in response to an instruction received in a shopping application from the shopper. The shopping application may be associated with the entity owning or controlling the physical retail location of store 300. The shopping application may maintain a list of contacts to which such messages may be sent. Accordingly, an instruction to send a message need not specify specific recipients for the message, but rather invoke sending of a message to the contact list in response to an instruction to do so received in the shopping interface.

A message may also be transmitted by shopper device 104a at position B to remote device 104b. For example, upon detecting that the shopper device 104a is at a store, or within a threshold distance from the store 300, the shopper device 104a may transmit a notification to the remote device 104b. The notification may indicate that the shopper is shopping at the store 300. The notification may be transmitted by a shopping application executing on the shopper service and may be transmitted to a shopping application executing on the remote device 104b.

At a position C within the store 300 during a shopping trip, the shopper device 104a may interact with a remote device 104b. Interaction may include text, voice, or video conversations between the devices 104a, 104b and may include photos or other information for items in a shopping list. The interaction may be performed in the context of shopping applications. For example, a user may select an item from a shopping list. In response to this selection, an interface for sending a message referencing that item may be displayed. Messages sent through that interface may automatically reference the item without the user having to manually type an identifier for the item.

Figure 4A:
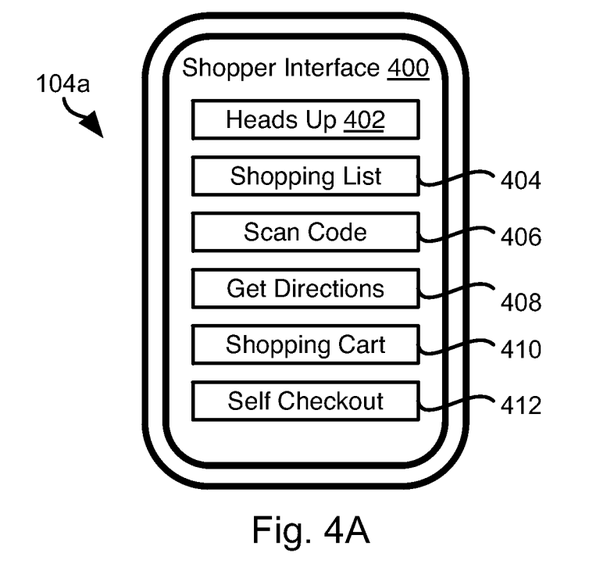
FIGS. 4A through 4C are diagrams of interfaces displayable on a user computing device and suitable for use in accordance with embodiments of the invention.

FIG. 4A illustrates an interface 400 that may be displayed on a shopping device 104a and be displayed by a shopping application hosted on a shopping device 104a. For purpose of this application, a shopping device 104a may also operate as a remote device. Accordingly, any user device 104a, 104b may host software for performing both functions associated with a shopping device 104a and a remote device 104b.

The shopping interface 400 may include a "heads up" element 402 that, when selected by a user, sends a message to a contact list indicating that a shopper is heading to the store 300. The message may include other pre-written content such as a message indicating such information as "[user] is heading to [store]. Add any needed items to [shopping list]."

The shopping interface 400 may include a "shopping list" element 404 that, when selected by a user, invokes display of a shared shopping list. The display of a shared shopping list may include a listing of item identifiers, one or more interface elements for browsing a product catalog, one or more interface elements for adding items to a shopping list, one or more interface elements for removing items from an electronic shopping list, or other functions for managing or collaborating with respect to a shopping list.

The shopping interface 400 may include a "scan code" element 406 that, when selected by a user, invokes scanning of an optical code (universal product code (UPC), quick response (QR) code, or the like). Upon scanning the code, an item corresponding to the code may be added to an electronic shopping list either automatically or in response to receipt of an instruction to do so. Alternatively, scanning a code may invoke, either with or without user confirmation, addition of an item corresponding to an electronic shopping cart, i.e. a data structure indicating items that are actually in a physical shopping or cart or otherwise will be purchased soon.

The shopping interface 400 may include a "get directions" element 408 that, when selected by a user, invokes the determination and display of turn-by-turn directions to items in a shopping list. In particular, a route among the aisles and displays of a store 300 may be generated that will guide the shopper to each item of the list. Directions to items of a shopping list may be provided according to the methods disclosed in U.S. application Ser. No. 13/650,652 filed Oct. 12, 2012, which is hereby incorporated herein by reference.

In some embodiments, alone or in combination with providing directions to items on a shopping list, directions to in-store events may be provided if such events are occurring while a shopper is in a store. For example, a database of such events may be stored on a server system 102*a*, 102*b*. A descriptor of such an event, a time range for such an event, and/or other information may be transmitted to a user device 104*a*, 104*b*, e.g. shopping application executing thereon, in response to detection of proximity as disclosed herein or transmission of a "heads up" message. The shopping application, or a function executing on a server system 102*a*, 102*b*, may use the location information to generate and display directions on the user device 104*a*, 104*b* to the in-store event upon determining that the device 104*a*, 104*b* is in the store during the time range associated with the in-store event. The in-store events may be treated the same as an item in a shopping list in that a route may be generated that guides the shopper to items on a shopping list as well as to in-store events in an efficient manner that reduces or otherwise optimizes time and/or distance traveled, such as according to the methods disclosed in the '652 application or other in-store navigation method.

The shopping interface 400 may include a "shopping cart" element that, when selected by a user, invokes display of an electronic shopping cart. The display of an electronic shopping cart may include a listing of items added to the shopping cart as well as interface elements for searching a product catalog, removing items from the shopping cart, adding items to the shopping cart, and the like.

The shopping interface 400 may include a "self checkout" element 412 that, when selected by a user, invokes a "self checkout" interface and functionality. Performing self checkout may include performing checkout with respect to an electronic shopping cart including the list item. Performing self checkout may include performing mobile self checkout in cooperation with a POS 106. For example, a POS 106 may receive a request to use mobile self checkout (MSCO). This may be communicated verbally to a cashier who then inputs or otherwise specifies the MSCO option to the POS 106. In response to receipt of this instruction, the POS 106, may generate and display a code that is used to couple a particular user computing device 104*a* to that POS 106. The displayed code may be a one-off code that is generated for each transaction or otherwise used for only one transaction.

The user computing device 104*a* scans the displayed coupling code. The user computing device 104*a* then transmits the contents of the electronic cart to the POS 106 using the coupling code. This coupling code may be an address that can be used to transmit the contents of the electronic shopping cart directly to the POS 106. Alternatively, the contents of the cart with the coupling code may be transmitted with the coupling code to a server system 102*a*, 102*b*. The server system 102*a*, 102*b* may then interpret the coupling code to identify the POS 106 that generated the coupling code and transmit the contents of the electronic shopping cart to this POS 106.

The contents of the electronic shopping cart received by the POS 106*a* may then be used to conclude the transaction on the POS 106*a*. The items received by the POS 106 may, for example, may treated in the same manner as items input to the POS 106 by scanning bar codes in the conventional manner. Likewise, concluding the transaction may include receiving tender of cash, check, or electronic payment, as for the typical in-store transaction. Other methods known in the art for concluding a transaction for an electronic shopping cart input to a user computing device 104*a* may also be performed. Likewise, items may simply be added to a physical shopping cart. A user may check off items from a shopping list as they are added to the physical shopping cart. A transaction to purchase the items may be concluded at a POS 106 in the conventional manner.

Figure 4B:
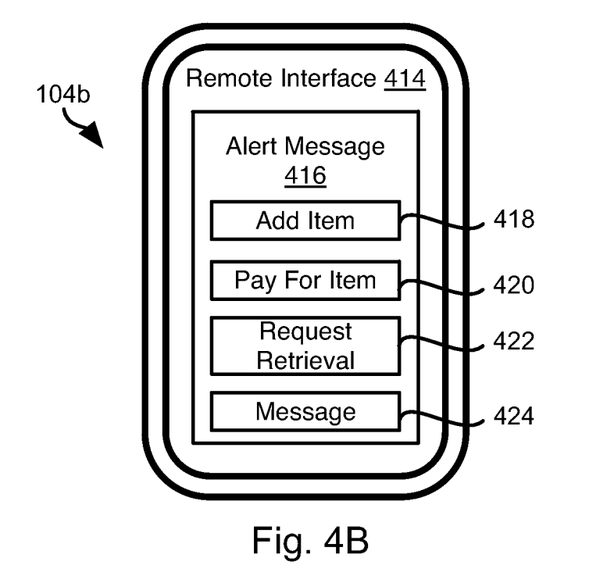

FIG. 4B illustrates an interface 414 that may be displayed on a remote device 104*b*. As noted above, any user device 104*a*, 104*b* may function as a remote device or a shopping device 104*a*. Accordingly, either device 104*a*, 104*b* may implement the remote interface 414. The remote interface 414 may be implemented by a shopping application associated with a store 300.

The remote interface 414 may display an alert message 416. The alert message 416 may be displayed in response to a message received from a shopping device 104*a* and contain information from such a message. As noted above, the message may be sent in response to detecting the shopping device 104*a* in proximity to a store or on response to an instruction to send a "heads up" message.

The alert message 416 may include textual description of the purpose of the message. For example, "[user] is shopping at [store], do you want to add to your shared shopping list?," or like information. The alert message 416 may include, or be displayed with, an "add item" element 418 that, when selected by a user, invokes an interface for adding to a shared shopping list. The shared shopping list may be referenced in the alert message, be determined based on user identifiers of the sender and recipient of the alert message, or the like.

The interface displayed in response to selection of the "add item" element 418 may include an interface for browsing a product catalog, selecting items, and invoking addition of selected items to a shopping list. The interface invoke may also include interface elements for displaying or invoking display of a personal shopping list or other shopping list other than the shared shopping list associated with the alert message. The display of other shopping lists may include interface elements for receiving a user instruction to add an item from the other shopping lists to the shared shopping list and executing this instruction.

The remote interface 414 may include a "pay for item" element 4120 that, when selected, invokes an interface for a user to pay for an item in a product catalog that can subsequently be picked up in a store. For example, Wal-Mart™ offers a "ship-to-store," "pick up today," and "scan and go" functionality in which an item may be purchased online and shipped to a nearby store.

The interface may also include a "request retrieval" element 422 that, when selected, invokes display of a list of items available for pickup at the store 300 and associated with the recipient of the alert message. For example notifications that such an item is available for pick up may be associated with the shopping application. Accordingly, in response to the alert message, and/or selection of the "request retrieval" element 422, a recipient of the alert message may select such a previously-purchased item from a display thereof and issue an instruction for addition of the previously-purchased item that is available for pickup to the shared shopping list. In response to such an instruction to add a previously-purchased item to a shopping list, a password, code, or other authentication information may be sent to the shopping device 104*a* to enable the shopper associated with the shopping device 104a to verify authority to pick up the previously-purchased item on behalf of the remote person. In some embodiments, in response to an instruction to request retrieval of the previously purchased item, a message may also be transmitted to a POS 106 or other device accessed by a store representative, the message indicating that the shopper (e.g. a shopper having a given identity as verified by photo ID or presentation of a code) has authority to pick up the previously-purchased item for which the request for retrieval has been received.

The remote interface 414 may include a "message" element 424 that, when selected by a user, invokes an interface for sending a message to the shopping device 104a that originated the alert message 416. A message may be sent from one shopping application to another shopping application or may be sent by SMS text, email, or some other means to the shopping device 104a.

Figure 4C:
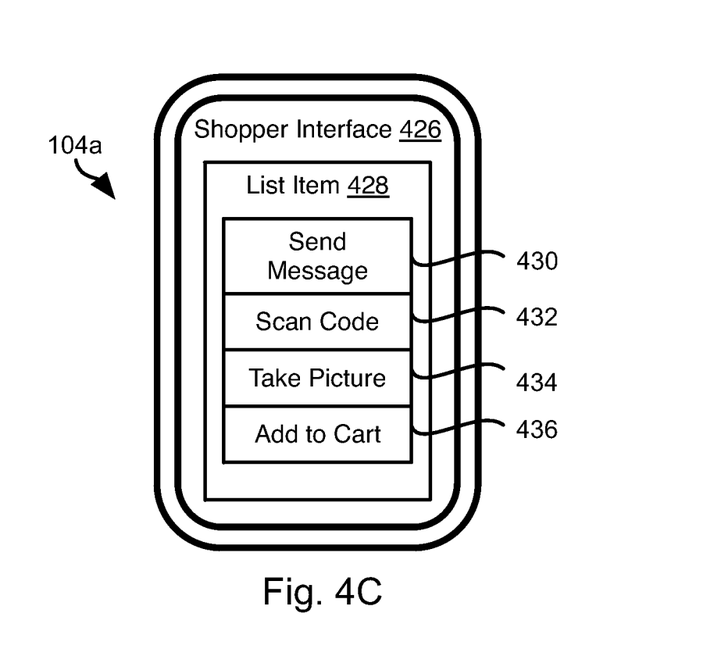

FIG. 4C illustrates a shopper interface 426 that may be displayed by a shopping application on shopping device 104a. The shopper interface may display a list item 428 and may include information describing a list item, such as a product identifier, price, or other information. The displayed list item 428 may be displayed in response to user selection of an item in a shopping list, such as a shared shopping list in accordance with the methods disclosed herein.

A list item 428 may be displayed with the illustrated interface elements or the illustrated interface elements may be accessible for performing corresponding operations with respect to a list item 428. For example, a "send message" interface element 430 may invoke an interface for sending a message with respect to the list item 428. For example, a message that is pre-populated with information regarding the list item may be generated, such as a price, a description, product identifier, product image, or the like. A user may then add text to the message and the message transmitted to another user, such as another user device 104b associated with another user associated with the shared shopping list.

In some embodiments, a "scan code" element 432 may be included in the interface 426 and that, when selected by a user, invokes a utility for scanning a code, associating the item 428 with an electronic shopping cart, associating information corresponding with the scanned code with a message, or some other functionality.

In some embodiments, a "take picture" element 434 may be associated with the list item 428 that, when selected by a user, enables a user to add an image to the message, such as by taking a picture of a product corresponding to the list item (or an alternative therefor), and associating the picture with the message.

In some embodiments, the shopper interface 426 may include an "add to cart" element 436 that, when selected by a user, invokes addition of the list item 428 with an electronic shopping cart.

Figure 5:
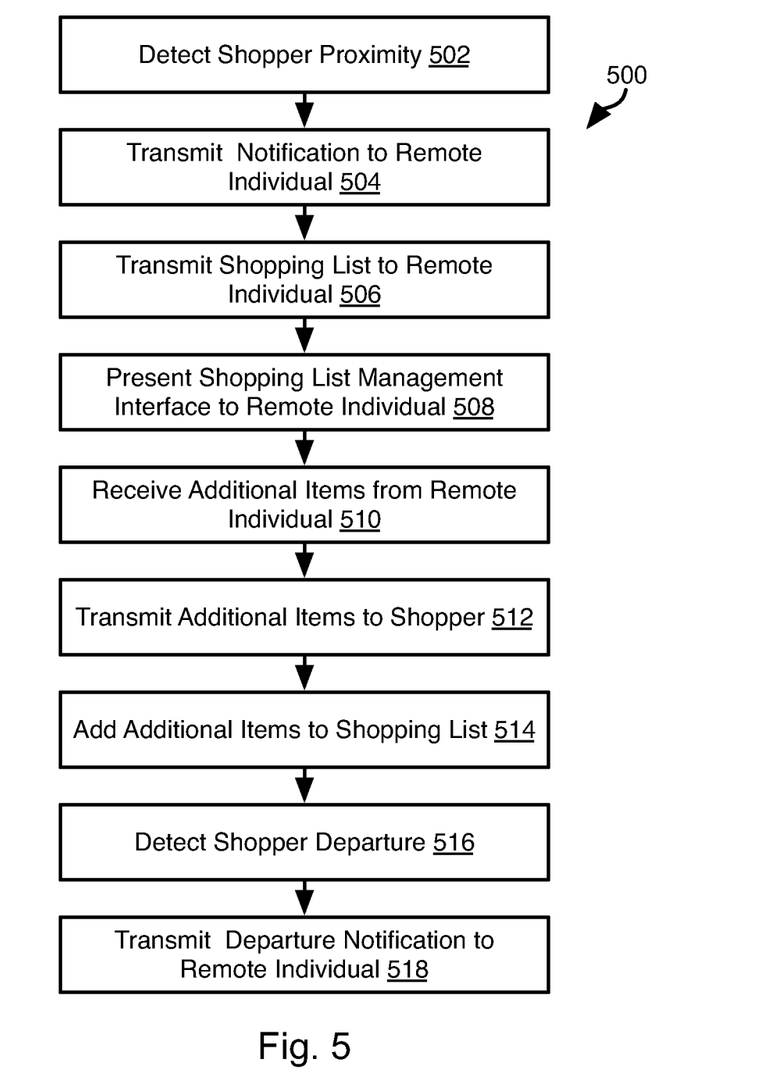
FIG. 5 is a process flow diagram for characterizing a customer's purchases in accordance with an embodiment of the present invention.

FIG. 5 illustrates a method 500 for collaborative shopping. The method 500, and the other methods described hereinbelow, may be executed at a server system 102a, shopper device 104a, remote device 104b, or a combination of some or all of these devices. Specifically, the recited functionality may be performed on any one of these devices or distributed among two or more of these devices.

The method 500 may include detecting 502 proximity of a customer to a store. For example, a global positioning system (GPS) within a shopper device 104a may indicate that the user is within a store 300 or within a threshold proximity of a store 300, such as a store participating in methods described herein.

The method 500 may include transmitting 504 notification to one or more remote devices 104b in response to the detecting 502. For example, a shopping application on the shopper device 104a may transmit a message to shopping applications hosted by the one or more remote devices 104b. A contact list may be stored or accessed by the shopping application of the shopping device 104a and transmitting 504 notification may include transmitting the notification to the addresses of the contact list. As noted above, the notification may indicate that a user associated with the shopping device 104a is at the store and indicate that the recipient of the notification can add items to a shared shopping list. In some instances where a recipient does not have the shopping application installed, the notification may include a link to a site for downloading and installing the application or other instructions for obtaining the application.

The method 500 may further include transmitting a shared shopping list to the one or more remote devices, the shared shopping list being a shared shopping list among the users associated with the one or more remote devices 104b and the shopper device 104a. In some embodiments, a shared shopping list may be hosted on a server system 102a, 102b. Accordingly, a notification may include a link or user interface element that invokes retrieval of the shared shopping list from the server system 102a, 102b and display thereof on the one or more remote devices 104b. Alternatively, an official or canonical version of the shared shopping list may be stored on the shopper device 104a such that the shared shopping list may be transmitted 504 with the notification, or in response to a user interacting one the remote device 104b with an element included in the notification that invokes retrieval of the shared shopping list from the shopper device 104a.

The shopping applications of the one or more remote devices 104b may present 508 the notification with interface elements for interacting with the shared shopping list, or an interface element for invoking an interface for interacting with the shared shopping list. For example, user interface elements for invoking a browser for a product catalog, adding products from a product catalog to the shopping list, adding items from a personal list of a recipient to the shared shopping list, adding previously-purchased items to be picked up to the shared shopping list, and other elements for facilitating addition of items to the shared shopping list or otherwise modifying or interacting with the shared shopping list.

As a result of user interaction, with the presented 508 interface, one or additions to the shared shopping list may be received on the one or more remote devices 104b. These additional items may be transmitted 512 to the remote shopper. Where a shared shopping list is stored and/or accessed by a server system 102a, 102b, the additions may be transmitted to the server system 102a, 102b and use to update an authoritative version of the shopping list. The changes may then be transmitted to the shopper device 104a and one or more remote devices 104b. The additional items may be added 514 to the shared shopping list stored and/or displayed on the shopper device 104a.

In some embodiments, departure of a shopper from a store may be detected 516 and notification of this departure may be transmitted 518 to the one or more remote devices 104b, such as some or all of the same one or more remote devices that were notified 504 of the shopper's arrival. Departure may be detected by means of a GPS receiver in the shopper device moving out of a footprint of a store 300 or out of a threshold proximity of the store 300.

Figure 6:
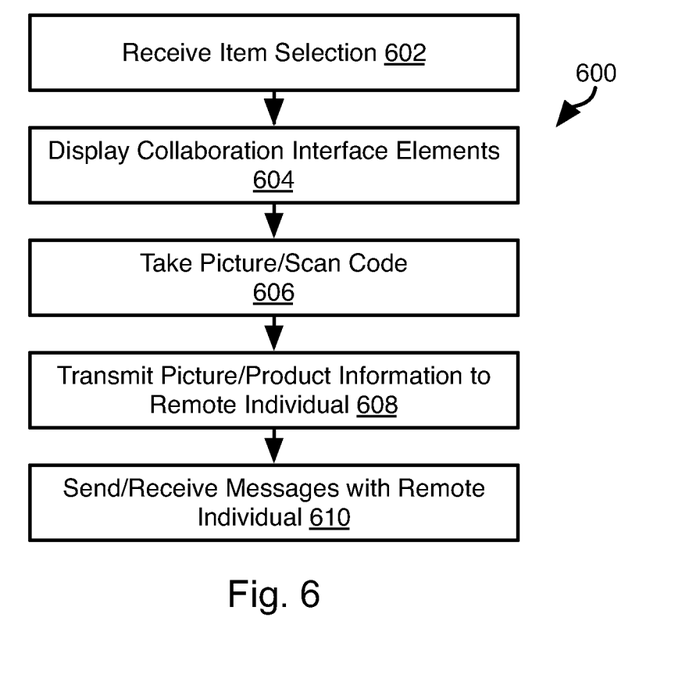
FIG. 6 is a process flow diagram of a method for messaging during a shopping trip in accordance with an embodiment of the present invention.

FIG. 6 illustrates a method 600 that may be performed to facilitate communication with respect to a shared shopping list. The method 600 may include receiving 602 selection of an item on a representation of a shared shopping list displayed on a shopper device 104a or remote device 104b and, in response, displaying 604 one or more interface elements for collaborating with respect to the selected item. For example, interface elements may be selected to invoke taking 606 of a picture or scanning an optical code using the shopper device 104a or remote device 104b.

A picture taken at step 606 or product information for a code scanned at step 606 may then be transmitted 608 to another device such as the remote device 104b. For example, where user is not at a store, the user may scan a product code or take a picture of a product to send to a shopper in order to facilitate location of the product by the shopper. Likewise, a shopper may scan a product code or take a picture of a product in a store in order to confirm that an item is appropriate or propose an alternative to the selected 602 item.

The method 600 may further include sending and receiving 610 messages between the shopper device 104a and the remote device 104b in the form of textual messages, voice messages, video messages, or the like. Messages may be input and transmitted by a shopping application or a native messaging interface of the shopper device 104a and/or remote device 104b.

Figure 7:
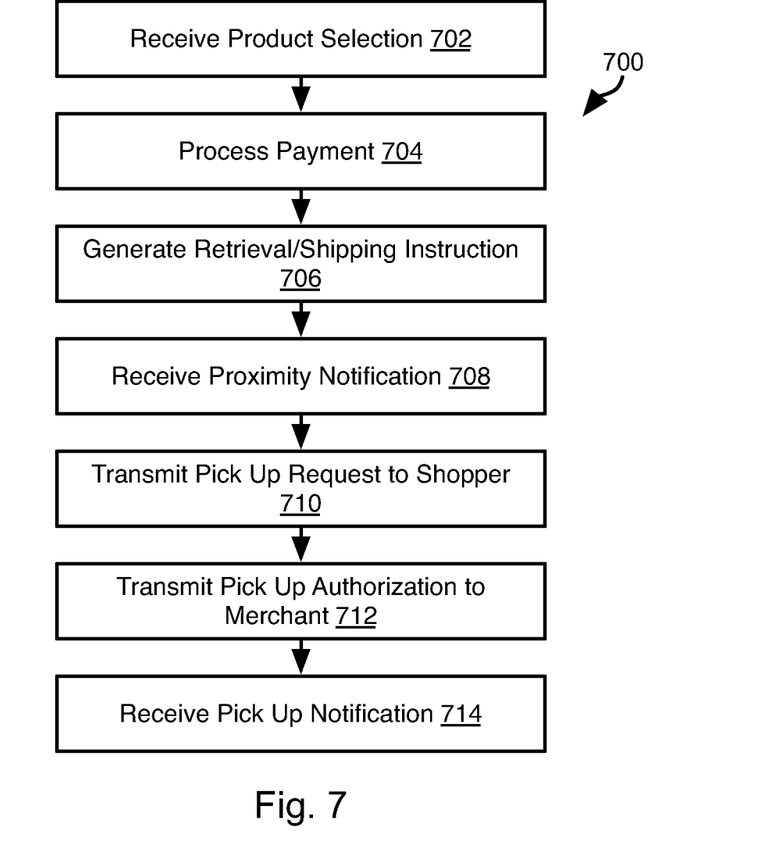
FIG. 7 is a process flow diagram of a method for requesting pick-up of previously-purchased items in accordance with an embodiment of the present invention.

FIG. 7 illustrates a method 700 that may be used to facilitate pick up of previously-purchased items. As noted above, a product may be selected and purchased online and the product retrieved at a store. The product may be in stock at the store and a user may request retrieval of the item such that the item can simply be retrieved at a POS. Likewise, a product maybe purchased and shipped to a store rather than a residence for subsequent pick up by the customer. Although the method 700 is useful for items that are paid for prior to pick up, the method 700 may be used as part of any method where an item is selected online and an instruction issued to a merchant for the item to be shipped to a store or otherwise retrieved for subsequent pick up by a user.

Accordingly, the method 700 may include receiving 702 selection of a product, processing 704 payment for the product, and generating 706 an instruction to retrieve the product for pick up or ship the product to a store for pick up. As noted above, processing of payment 704 may be omitted such that payment is made at a store during the pick up process. Steps 702-706 may occur on a mobile device, desktop computer, or other device hosting a browser operable to host a web site implementing this functionality in communication with a server system 102a, 102b. The selection of a product and processing of payment may be part of a "Pay in Person," "Click and Pull," or "Site to Store" transaction with Wal-Mart™. Examples of a "Pay in Person" transaction are disclosed in U.S. application Ser. No. 13/600,821 filed Aug. 31, 2012, which is hereby incorporated herein by reference in its entirety.

The method 700 may further include receiving 708 a proximity notification indicating that a shopper device 104a is at a store 300 or within a threshold proximity of a store 300 as for the methods described hereinabove. In response to this notification, a pick up request may be transmitted to the shopping device 104a. The pick up request may include such information as a product identifier, transaction identifier, purchaser identifier, availability date, instructions on where to request pick up in the store, or the like.

Transmitting 710 the request for pick up may include adding the item to be picked up to a shopping list with a label or other indicator indicating that the item is to be picked up at a specific location in the store rather than to be found among the shelves and floor displays of the store. In some embodiment, transmission 710 of the request for pick up may be performed automatically without receiving an explicit user instruction to do so. For example, a first user may input authorization to a shopping application for certain other users to pick up items for the first user. Upon receiving a proximity notification indicating proximity of one of these users to the store at which an item is available for pick up by the first user, the shopping application of the remote device 104b of the first user may automatically transmit 710 a request to pick up items to the shopper device 104a, if any, that are available for pick up.

The method 700 may include transmitting 712 authorization to a merchant, the authorization indicating that a user associated with the shopper device is authorized to pick up the selected product. For example, authorization may be transmitted from the remote device 104b to a server system 102a, 102b that transmits authorization to a POS 106. For example, at a POS 106, a store representative may receive a user identifier or some other code with or without a transaction identifier. The POS 106 may transmit some or all of this information to a server system 102a, 102b. The server system 102a, 102b may then response by transmitting an indicator of authorization for the person presenting this information to pick up the selected product.

In some embodiments, transmitting 712 authorization may include transmitting a code or other data structure to the shopper device 104a that when input to a POS 106 indicates to the POS 106 that the presenter of the code has authority to pick up the selected product for which the authorization was received.

The method 700 may further include receiving 714 a pick up notification by the remote device 104b. The pick up notification may be transmitted by the server system 102a, 102b or by the shopper device 104a.

Figure 8:
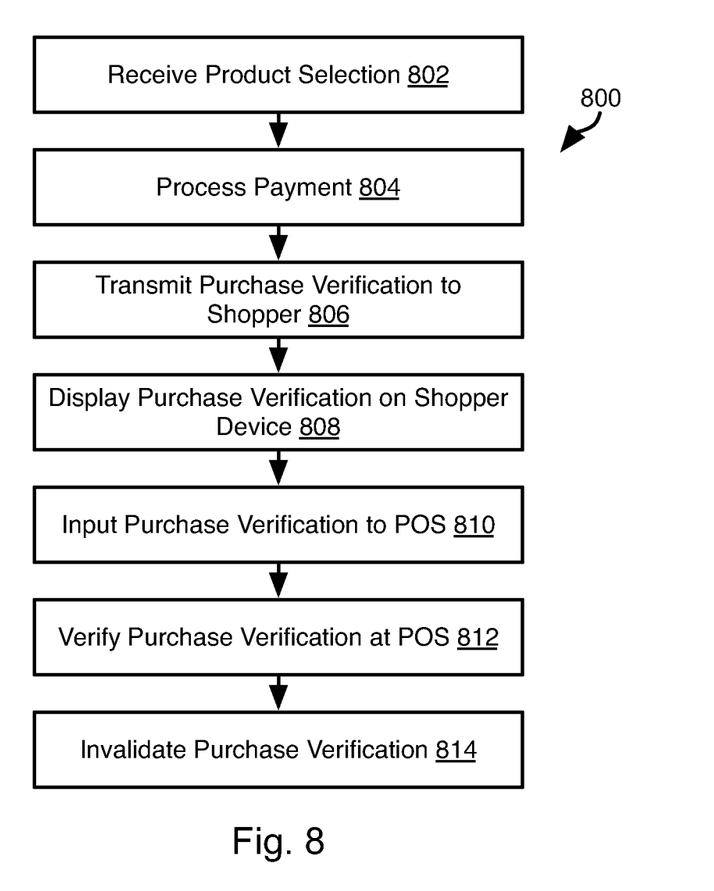
FIG. 8 is a process flow diagram of a method for authorizing pick-up of a previously-purchased item in accordance with an embodiment of the present invention.

FIG. 8 illustrates another method 800 for requesting retrieval of a previously purchased item. The method 800 may include receiving 802 a product selection, such as from a remote device 104b by means of an ecommerce website and processing 804 payment for the item. The method 800 may further include transmitting 806 a code, image, optical code, or other data to a shopper device 104a that indicates proof of purchase of the product. Transmitting 806 may be with or in response to transmission of a request for the user associated with the shopper device 104a to pick up the product according to any of the methods described herein.

The method 800 may include displaying 808 the purchase verification on the shopper device and inputting 810 the purchase verification to a POS 106 by means of scanning, image capture, or manual entry into the POS 106. The POS 106 may transmit the purchase verification, or data extracted therefrom, to a server system 102a, 102b. The server system 102a, 102b may use the data to identify the transaction processed at step 804. If the purchase verification is found to be valid by the server system 102a, 102b, then a confirmation of the purchase verification may be transmitted 812 to the POS, indicating that a product has already been paid for. The server system 102a, 102b may then invalidate the purchase verification such that it cannot subsequently be used. The server system 102a, 102b may invalidate 814 the purchase verification upon receiving the request for confirmation from the POS 106 or in response to a subsequent message. For example, the POS 106 may transmit a usage message to the server system 102a, 102b indicating that the purchase verification was in fact used to show prior payment for a product. In some embodiments, the purchase verification may be an "ereceipt" as disclosed in U.S. application Ser. No. 13/751,584 filed Jan. 28, 2013, which is hereby incorporated herein by reference in its entirety.

The invention may be embodied in other specific forms without departing from its spirit or essential characteristics. The described embodiments are to be considered in all respects only as illustrative, and not restrictive. The scope of the invention is, therefore, indicated by the appended claims, rather than by the foregoing description. All changes which come within the meaning and range of equivalency of the claims are to be embraced within their scope.

The invention claimed is:

1. A method for collaborative shopping, the method comprising, by a computer system:
   automatically detecting proximity of a first user device to a retail location using a GPS receiver of the first user device relative to a GPS footprint of the retail location;
   in response to the detecting proximity, transmitting a notification from the first user device to a second user device, the notification effective to invoke a shopping interface on the second user device;
   transmitting an electronic shopping list to the second user device, the electronic shopping list being shared between the first user device and the second user device based on a first identifier unique to the first user and a second identifier unique to the second user and previously uninvoked on the second user device until the detecting proximity and a matching of the first identifier with the second identifier;
   receiving, from the shopping interface on the second user device a modification of the electronic shopping list;
   transmitting an update from the second user device including the modification of the electronic shopping list to a shopping interface on the first user device;
   automatically detecting departure of the first user device from the retail location by determining the GPS receiver has moved out of the GPS footprint of the retail location; and
   in response to the detecting departure, transmitting a notification from the first user device to the second user device, the notification effective to indicate that the time period for modifying the electronic shopping list has ended.

2. The method of claim 1, further comprising:
   receiving, from the first user device an instruction to add one or more items to the electronic shopping list; and
   adding the one or more items to the electronic shopping list.

3. The method of claim 1, further comprising providing directions within the store to items of the electronic shopping list.

4. The method of claim 1, further comprising:
   receiving from the first user device a message referencing an item in the electronic shopping list; and
   transmitting to the second user device the message to the shopping interface of the second user device.

5. The method of claim 4, wherein the message includes an image.

6. The method of claim 1, further comprising:
   receiving authorization of payment from the second user device for an item;
   processing payment for the item;
   receiving an instruction from the second user device to authorize a user associated with the first user device to pick up the item; and
   transmitting a notification to pick up the item to the first user device, the notification referencing the item.

7. The method of claim 6, further comprising transmitting authorization referencing a user associated with the second device to a point of sale (POS) device at the retail location.

8. The method of claim 6, further comprising transmitting a proof of purchase to the second user device;
   receiving, from a point of sale (POS) device, notification of presentation of the proof of purchase;
   transmitting, to the POS device, validation of the proof of purchase; and
   in response to the receiving notification of presentation of the proof of purchase, invalidating the proof of purchase.

9. The method of claim 8, further comprising transmitting notification of pick-up of the item to the second user device.

10. The method of claim 1, further comprising:
    receiving an instruction in a shopping interface on the first user device to transmit a message to the shopping interface on the second user device, the message indicating an intent to visit the retail location; and
    in response to receiving the instruction, transmitting the message to the second user device.

11. A system for collaborative shopping, the system comprising one or more processors and one or more memory devices operably coupled to the one or more processors, the one or more memory devices storing executable and operational data effective to cause the one or more processors to:
    automatically detect proximity of a first user device to a retail location of one or more retail locations using a GPS receiver of the first user device relative to a GPS footprint of the retail location;
    in response to the detecting proximity, transmit a notification from the first user device to one or more other user devices, the notification effective to invoke a shopping interface on the second user device;
    transmit an electronic shopping list to the one or more other user devices, the electronic shopping list being shared between the first user device and the one or more other user devices based on a first identifier unique to the first user and a second identifier unique to one of the other users and previously uninvoked on the one or more other user devices until the detecting proximity and a matching of the first identifier with the second identifier;
    receive, from the shopping interface on one or more other user devices a modification of the electronic shopping list;
    automatically detect departure of the first user device from the retail location by determining the GPS receiver has moved out of the GPS footprint of the retail location; and
    in response to the detecting departure, transmit a notification from the first user device to the one or more other user devices, the notification effective to indicate that the time period for modifying the electronic shopping list has ended.

12. The system of claim 11, wherein the one or more processors and one or more memory devices are incorporated into the first user device.

13. The system of claim 12, wherein the executable and operational data are further effective to cause the one or more processors to:
    receive from the one or more other user devices a notification that the one or more other user devices are proximate one of the one or more retail locations;
    present the notification in a shopping interface;

receive product selections in the shopping interface;

transmit the product selections to a shopping interface of a device of the one or more other user devices from which the notification was received.

14. The system of claim 11, wherein the executable and operational data are further effective to cause the one or more processors to:

receiving selection of an item in the electronic shopping list;

present an interface including a user interface element for invoking a message with respect to the item;

receiving a message with respect to the item;

transmit the message to a second user device of the one or more other user devices.

15. The system of claim 14, wherein the message includes an image.

16. The system of claim 11, wherein the executable and operational data are further effective to cause the one or more processors to:

receive, from a device of the one or more other user devices, a notification to pick up an item, the item having been previously purchased by a user associated with the device.

17. The system of claim 16, wherein the executable and operational data are further effective to cause the one or more processors to:

receive a proof of purchase for the item;

present the proof of purchase for the item at the retail location.

18. The system of claim 11, wherein the executable and operational data are further effective to cause the one or more processors to:

receive an instruction to authorize payment for an item;

interact with a merchant server to process payment for the item; and transmit an instruction to a shopping interface of a device of the one or more other user devices to pick up the item.

19. The system of claim 18, wherein the executable and operational data are further effective to cause the one or more processors to transmit notification of pick-up of the item to the device of the one or more other user devices.

20. The system of claim 11, wherein the executable and operational data are further effective to cause the one or more processors to:

receive an instruction in a shopping interface to transmit a message to the shopping interface on the second user device, the message indicating an intent to visit the retail location; and in response to receiving the instruction, transmit the message to the one or more other user devices.

\* \* \* \* \*